United States Patent [19]

Chitayat

[11] 4,378,709

[45] Apr. 5, 1983

[54] FRICTION DRIVE FOR POSITIONING TABLE

[75] Inventor: Anwar Chitayat, Plainview, N.Y.

[73] Assignee: Anorad Corp., Happauge, N.Y.

[21] Appl. No.: 195,238

[22] Filed: Oct. 8, 1980

[51] Int. Cl.³ .................... F16H 13/10; F16H 15/00
[52] U.S. Cl. ........................................ 74/207; 74/89;
74/202; 108/143; 248/178
[58] Field of Search ............... 74/202, 206, 207, 208,
74/209, 89; 108/137, 143; 269/73; 248/178, 651

[56] References Cited

U.S. PATENT DOCUMENTS

| | | | |
|---|---|---|---|
| 3,155,383 | 11/1964 | Whitmore | 108/143 |
| 3,232,128 | 2/1966 | Randolph et al. | 74/207 |
| 3,495,519 | 2/1970 | Alfsen et al. | 108/137 |
| 4,226,128 | 10/1980 | Dellantonio | 74/89 |

FOREIGN PATENT DOCUMENTS 2229380 12/1973 Fed. Rep. of Germany ...... 108/143

Primary Examiner—Leslie A. Braun
Assistant Examiner—Lawrence J. Gotts
Attorney, Agent, or Firm—Thomas R. Morrison

[57] ABSTRACT

A friction drive for a positioning table employs a friction drive bar centered along the axis of the positioning table and coupled to the positioning table through a flexure member which allows lateral translation of the friction drive bar with respect to the table. The shaft of a rigidly mounted servomotor is tightly pinched against the side of the friction drive bar by a pair of back-up rollers on a pivoted support bar anchored to the frame bearing against the off side of the servomotor shaft and a pressure roller, also mounted on an anchored pivoted support bar, bearing against the opposed side of the friction drive bar. The pair of back-up rollers and the pressure roller are resiliently urged together to firmly pinch the servomotor shaft and friction drive bar together. The anchored pivoted support bar carries through longitudinal forces to prevent deflection of the servomotor shaft.

5 Claims, 7 Drawing Figures

FRICTION DRIVE FOR POSITIONING TABLE

BACKGROUND OF THE INVENTION

The present invention is related to drive means for positioning tables and, more particularly, to drive means for XYZ positioning tables wherein at least one table is constrained to travel to controllable positions along a longitudinal axis.

Positioning tables requiring high accuracy, such as, for example, positioning tables used in the preparation of solid state components and the like, require positioning accuracy measured in units on the order of 0.0001 inch. The attainment of such accuracy does not permit ignoring any sources of error which can be eliminated.

A positioning apparatus for one axis conventionally employs a table which is longitudinally guided along machined grooves in a frame into which rolling or sliding members on the table are fitted. A lead screw, rotated by a servomotor extends along a center line of the entire path to be traversed by the table. Traveling nuts affixed to the underside of the table engage the lead screw and, as the servomotor turns clockwise and counterclockwise, move the table back and forth. Optical or other conventional means affixed to the table are employed to measure the table position along its axis and to produce signals which, when fed to a conventional table controller, are employed to generate control signals for application to the servomotor.

In very precise applications, position inaccuracies arise from a number of sources. If the guides which constrain the longitudinal motion of the table are not accurately parallel to the lead screw, the preloading between the table and the guides varies from position to position along the travel and consequently produces a positioning error. Furthermore, lack of concentricity in the servomotor bearing can also produce error. Also, a certain amount of backlash can be expected in a screw-driven apparatus.

In addition to high accuracy, some applications require rapid motion from position to position. Positioning tables operating under start-stop-reverse conditions require high torque for achieving high positioning rates. The inclusion of a relatively massive lead screw in prior art systems adds to the torque requirement placed on the servomotor and/or limits the maximum positioning rate.

OBJECTS AND SUMMARY OF THE INVENTION

Accordingly, it is an object of the present invention to provide a drive for a positioning table which overcomes the drawbacks of the prior art.

It is a further object of the invention to provide a friction drive for a positioning table which eliminates the need for a lead screw and related apparatus.

It is a further object of the invention to provide a drive apparatus for a positioning table which employs direct friction drive between a servomotor shaft and a friction drive bar coupled to the positioning table by flexure members. Lack of alignment between the servomotor shaft and the center line of the positioning table is taken up by flexing of the flexure members.

According to an aspect of the invention, there is provided an apparatus for driving a positioning table of the type having a top and in which the table is guided for driving in linear motion along a first axis by a servomotor comprising a friction drive bar disposed parallel to the first axis along a center line of the table, flexure means for coupling the friction drive bar to the table, the flexure means being effective to permit translation of the friction drive bar along a second axis normal to the first axis, the second axis being substantially parallel to the top, the servomotor having a shaft, the shaft being rotatable about a third axis substantially normal to the first axis and the second axis, and means for clamping a peripheral surface of the shaft into frictional contact with a longitudinal surface of the friction drive bar whereby the friction drive bar and the table are concertedly driven along the first axis by rotation of the shaft.

According to a feature of the invention, there is provided a positioning table of the type wherein the table includes a top and is constrained to travel to controllable points with respect to a frame along a first axis driven by a servomotor, the improvement comprising a friction drive bar disposed parallel to the first axis substantially centered with respect to the table, flexure means for coupling the friction drive bar to the table, the flexure means being effective to permit flexing thereof about an axis parallel to the first axis and to prevent flexing thereof about any other axis, whereby the friction drive bar is permitted to translate along a second axis parallel to the top, the servomotor being rigidly affixed to the frame and having a shaft which is rotatable about a third axis normal to the first and second axis, a peripheral surface on the shaft contacting the friction drive bar, a first support bar substantially parallel to the first axis at a first side of said friction drive bar and pivoted to the frame to rotate about an axis parallel to the third axis, a pressure roller rotatably mounted on the first support bar contacting the friction drive bar opposed to the shaft, a second support bar substantially parallel to the first axis at a second side of the friction drive bar and pivoted to the frame to rotate about an axis parallel to the third axis, first and second back-up rollers rotatably mounted on the second support bar contacting first and second points on the shaft, the first and second points being positioned symmetrically with respect to a point of contact of the shaft with the friction drive bar, and means for resiliently urging the first and second support bars together whereby the friction drive bar is pinched between the pressure roller and the shaft.

According to a further feature of the invention, there is provided a positioning apparatus comprising a frame, a table on the frame, the table being movable back and forth in a straight line, a friction drive bar centered along an axis of motion of the table, means for attaching the friction drive bar to the table, a servomotor fixed to the frame having a rotatable shaft, means for pinching a peripheral surface of the shaft into frictional contact with the friction drive bar, and the means for attaching being effective to permit lateral motion of the friction drive bar with respect to the table.

The above, and other objects, features and advantages of the present invention will become apparent from the following description read in conjunction with the accompanying drawings in which like reference numerals designate the same elements.

BRIEF DESCRIPTION OF THE DRAWINGS

FIG. 4 is a cross section taken along IV—IV of FIG. 2;

FIG. 5 is a simplified presentation of FIG. 4 showing deflection of a friction drive bar to the right;

FIG. 6 is a simplified presentation of FIG. 4 showing deflection of the friction drive bar to the left; and FIG. 7 is a cross section of a servomotor shaft and drive head taken along VII—VII in FIG. 6.

DETAILED DESCRIPTION OF THE PREFERRED EMBODIMENTS

Figure 1:
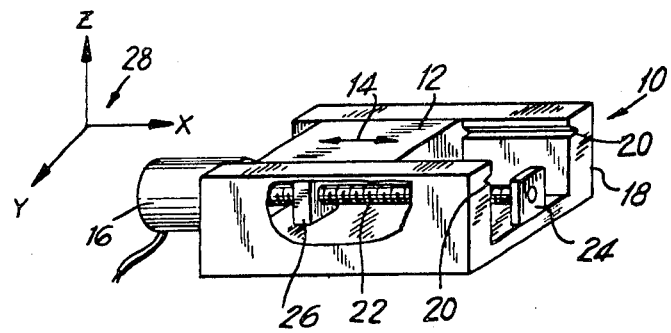
FIG. 1 is a perspective schematic view partly broken away of a single axis positioning table according to the prior art.

Before describing the present invention in detail, a brief description of a conventional positioning table is given with reference to FIG. 1 to provide background for understanding the present invention.

A conventional positioning table, shown generally at 10 in FIG. 1 includes a table 12 which may be moved back and forth in the directions shown by a double-headed arrow 14 under urging of an electric servomotor 16.

A U-shaped frame 18, preferably a monolithic rigid cast member, includes guide means such as V-shaped grooves 20 accurately machined in the inner surfaces of arms of U-shaped frame 18. Rollers or guides (not shown) in the edges of table 12 engage and roll or slide in V-shaped grooves 20.

A longitudinal lead screw 22 is journalled at its outward end in a bearing block 24 and is supported and rotated at its inboard end by servomotor 16. Lead screw 22 is accurately centered under table 12 and is preferably precisely aligned parallel to V-shaped grooves 20. A traveling nut 26 is rigidly affixed to the bottom of table 12 and is engaged by threads on lead screw 22. For smooth operation and minimum backlash, lead screw 22 is preferably a ball screw and traveling nut 26 is preferably a preloaded traveling nut including means for recirculation (not shown) of ball bearings.

The longitudinal position of table 12 is sensed by a conventional sensing means (not shown) and used in a conventional controller (not shown) to provide drive signals to servomotor 16.

The apparatus of FIG. 1 may serve to control one axis of a two or three orthogonal axis system. For example, the apparatus shown in FIG. 1 may provide motion along an X axis as represented in the three-axis coordinate system 28 illustrated in FIG. 1. To achieve comparable controlled motion along the Y axis, the apparatus of FIG. 1 may be mounted upon a corresponding apparatus to provide motion along the Y axis. Thus, motion along the Y axis is accomplished by moving the entire apparatus of FIG. 1 and motion along the X axis is accomplished by moving table 12 with respect to frame 18. Z-axis motion can be accomplished in a similar manner. In addition to the linear motions described in the preceding, rotary motion about one or more of the axes in the three-axis coordinate system 28 or any other axes may be provided by conventional equipment not shown.

Precise alignment of lead screw 22 with the X axis is critical to positioning accuracy. Slight misalignment of lead screw 22, machining tolerances in V-shaped grooves 20, eccentricities in the drive of servomotor 16 or concentricity errors in the motor bearing of servomotor 16 can all serve to add uncompensatable position errors.

Figure 2:
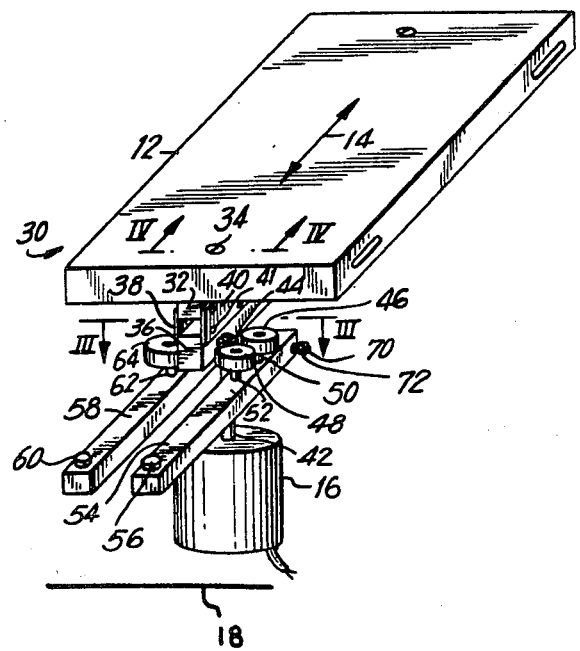
FIG. 2 is a perspective view of a friction drive apparatus for a positioning table according to an embodiment of the present invention with the frame omitted to reveal the drive components.

Referring now to FIG. 2, there is shown a positioning table 30 containing a friction drive according to an embodiment of the present invention with the U-shaped frame of FIG. 1 omitted for clarity of presentation. A support bar 32 is affixed along the center underside of table 12 by any suitable means such as, for example, by screws 34 preferably countersunk to or below the surface of table 12. A friction drive bar 36 is supported spaced below support bar 32 on flexure members 38 and 40 along substantially the entire length of support bar 32 and friction drive bar 36. Flexure members 38 and 40 are preferably thin metallic strips bridging the gap between the sides of support bar 32 and the sides of friction drive bar 36. Flexure members 38 and 40 may be attached by an convenient means, such as, for example, by a plurality of screws 41.

Servomotor 16 is rigidly affixed to the frame (not shown) of positioning table 30 with its shaft 42 disposed substantially normal to the direction of travel of table 12 indicated by double-headed arrow 14. A hardened drive head 44 rigidly affixed at the outboard end of shaft 42 bears frictionally against the side of friction drive bar 36.

First and second back-up rollers 46 and 48 are supported on shafts 50 and 52 mounted on a hinged support bar 54. Hinged support bar 54 is pivoted on a pivot such as, for example, a shoulder bolt 56 which is, in turn, rigidly affixed to the frame (not shown). Hinged support bar 54 extends generally parallel to the path of motion of table 12 and is urged in the counterclockwise direction in FIG. 2 about shoulder bolt 56 to bring the perimeters of back-up rollers 46 and 48 into contact with the perimeter of drive head 44 whereby drive head 44 is urged into firm frictional contact with friction drive bar 36.

Figure 3:
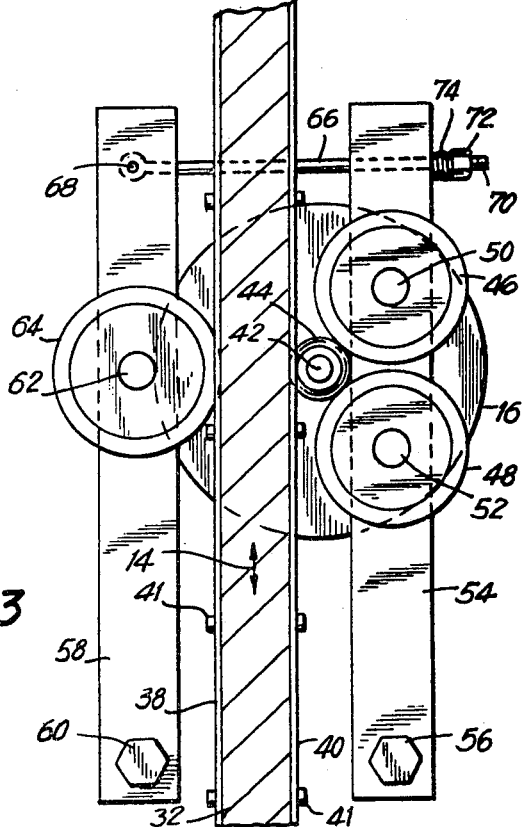
FIG. 3 is a cross section taken along III—III of FIG. 2.

Referring now also to FIG. 3, back-up rollers 46 and 48 contact drive head 44 at first and second points which are symmetrically arranged with respect to a point of contact of drive head 44 with friction drive bar 36 to thus trap drive head 44 between them. That is, any tendency of drive head 44 to move in the direction of arrow 14 is carried through back-up rollers 46 and 48, support bar 32 and shoulder bolt 56 to the frame (not shown) to thus resist deflection of shaft 42.

A second hinged support bar 58 extends generally parallel to the path of motion of table 12 and is pivoted on a shoulder bolt 60 rigidly affixed to the frame (not shown). Hinged support bar 58 supports a shaft 62 upon which a pressure roller 64 is rotatably mounted. Pressure roller 64 is urged to bear against friction drive bar 36 (FIG. 2) directly opposed to drive head 44.

A tension member such as a tension bar 66 is attached to the outboard end of hinged support bar 58 using any suitable means, such as, for example, a pin 68. Tension bar 66 passes through the outboard end of hinged support bar 54. At least the outer end 70 of tension bar 66 is threaded to receive a nut 72. A compression spring 74 is biased between the surface of hinged support bar 54 and nut 72 to urge support bar 54 counterclockwise about shoulder bolt 56 and to urge support bar 58 clockwise about shoulder bolt 60. As can best be seen in FIG. 3, compression spring 74 and tension bar 66 cause friction drive bar 36 to be pinched between pressure roller 64 and drive head 44 to provide close frictional coupling between drive head 44 and friction drive bar 36.

Tension bar 66, compression spring 74 and nut 72 may be replaced by a tension spring (not shown) biased between hinged support bars 54 and 58 without departing from the scope of the present invention.

Hinged support bar 54 is free to rotate about its shoulder bolt 56 in response to eccentricity of drive head 44 arising from any source in servomotor 16, shaft 42 or drive head 44. Its orientation parallel to the direction of motion of table 12 permits hinged support bar 54 to transfer longitudinal forces through shoulder bolt 56 to the frame (not shown). Thus, back-up rollers 46 and 48 are enabled to maintain constant contact with drive head 44 to urge drive head 44 into frictional contact with friction drive bar 36 and to support drive head 44 against any tendency to deflect in the direction of arrow 14.

Referring now to FIGS. 4, 5 and 6, flexure members 38 and 40 are preferably thin strips of semi-rigid plastic or of metal such as, for example, beryllium bronze or steel and are most preferably of blue spring steel having a thickness of from about 5 to about 25 thousandths of an inch. When table 12 is accurately centered in the frame (not shown), support bar 32 is accurately centered under table 12 and drive head 44 is perfectly aligned with friction drive bar 36, flexure members 38 and 40 are in the straight condition shown in FIG. 4. However, if any combination of the above sources of inaccuracy cause the center of support bar 32 to be displaced to the left of the center of friction drive bar 36, flexure members 38 and 40 are deformed into an S shape to permit friction drive bar 36 to maintain good frictional contact with drive head 44. Similarly, if the combination of inaccuracies places the center of support bar 32 to the right of the center of friction drive bar 36, flexure members 38 and 40 are deformed in an S shape to the left to again permit continued frictional contact of drive head 44 with friction drive bar 36. It should be noted that the sides of friction drive bar 36 remain parallel to the sides of support bar 32 when deflected as shown in FIGS. 5 and 6.

It would be clear to one skilled in the art that the use of flexure means 38 and 40 bridging substantially the entire lengths of support bar 32 and friction drive bar 36 permits lateral translation of friction drive bar 36 with respect to support bar 32 without permitting relative rotation therebetween about any axis. In addition, by using metal in flexure members 38 and 40, elastic deformation thereof except in the limited S-shaped deformation of FIGS. 5 and 6 is avoided.

Although the preferred embodiment illustrated and described in preceding paragraphs employs two flexure members 38 and 40, this should not be construed as limiting the invention. For example, flexure members 38 and 40, instead of being thin strips of metal bridging the gap along the entire lengths of both sides of support bar 32 and friction draft bar 36, may instead be a plurality of flexure members (not shown) spaced apart along the length of both sides of support bar 32 and friction drive bar 36. Furthermore, flexure member 38 may be omitted. Although this may not constrain remaining flexure member 40 to purely S-shaped deflections, significant errors may not be introduced thereby. In addition, more than two flexure members (not shown) may be employed.

Referring now to FIG. 7, shaft 42 includes a reduced-diameter end portion 76 which provides a press fit for a bore 78 in drive head 44. Drive head 44 has a crowned surface 80 for bearing against friction drive bar 36. Crowned surface 80 is preferably hardened for wear resistance.

Using a hardened press-on drive head 44 permits replacement thereof in case of water on crowned surface 80. Although the use of a crowned hardened drive head 44 is disclosed, it should not be assumed that the invention is necessarily limited to this feature. For example, shaft 42 may bear directly against friction drive bar 36. Shaft 42 may or may not be hardened in the region of contact and may or may not have a crowned surface at the point of contact.

Having described specific embodiments of the invention with reference to the accompanying drawings, it is to be understood that the invention is not limited to these precise embodiments, and that various changes and modifications may be effected therein by one skilled in the art without departing from the scope or spirit of the invention as defined in the appended claims.

What is claimed is:

1. A positioning apparatus comprising:
    a frame;
    a table on said frame, said table being movable back and forth in a straight line;
    a friction drive bar centered along an axis of motion of said table;
    means for attaching said friction drive bar to said table;
    a servomotor fixed to said frame having a rotatable shaft;
    means for pinching a peripheral surface of said shaft into frictional contact with friction drive bar; and
    said means for attaching being effective to permit translation of said friction drive bar in a direction normal to said axis of motion and substantially parallel to a surface of said table.

2. Apparatus for driving a positioning table of the type having a top and in which said table is guided for driving in linear motion along a first axis by a servomotor comprising:
    a friction drive bar disposed parallel to said first axis along a center line of said table;
    flexure means for coupling said friction drive bar to said table;
    said flexure means being effective to permit translation of said friction drive bar along a second axis normal to said first axis, said second axis being substantially parallel to said top;
    said servomotor having a shaft;
    said shaft being rotatable about a third axis substantially normal to said first axis and said second axis; and
    means for clamping a peripheral surface of said shaft into frictional contact with a longitudinal surface of said friction drive bar whereby said friction drive bar and said table are concertedly driven along said first axis by rotation of said shaft.

3. Apparatus according to claim 2 wherein said flexure means for coupling includes at least a first metallic strip joining said friction drive bar to said table along a substantial length of said friction drive bar.

4. Apparatus according to claim 2 wherein said means for clamping includes:
    a first support bar generally parallel to said first axis;
    first and second spaced apart back-up rollers rotatable on said first support bar;

means for pivoting said first support bar to bring said first and second back-up rollers into contact with the peripheral surface of said shaft at points which urge said shaft toward said friction drive bar;

a second support bar generally parallel to said first axis;

a pressure roller rotatable on said second support bar abutting said friction drive bar at a position opposed to said shaft; and means for resiliently urging said pressure roller and said first and second back-up rollers toward each other whereby said friction drive bar is clamped between said pressure roller and said shaft.

5. In a positioning table of the type wherein the table includes a top and is constrained to travel to controllable points with respect to a frame along a first axis driven by a servomotor, the improvement comprising:

a friction drive bar disposed parallel to said first axis substantially centered with respect to said table;

flexure means for coupling said friction drive bar to said table;

said flexure means being effective to permit flexure thereof about an axis parallel to said first axis and to prevent flexing thereof about any other axis, whereby said friction drive bar is permitted to translate along a second axis parallel to said top;

said servomotor being rigidly affixed to said frame and having a shaft which is rotatable about a third axis normal to said first and second axis;

a peripheral surface on said shaft contacting said friction drive bar;

a first support bar substantially parallel to said first axis at a first side of said friction drive bar and pivoted to said frame to rotate about an axis parallel to said third axis;

a pressure roller rotatably mounted on said first support bar contacting said friction drive bar opposed to said shaft;

a second support bar substantially parallel to said first axis at a second side of said friction drive bar and pivoted to said frame to rotate about an axis parallel to said third axis;

first and second back-up rollers rotatably mounted on said second support bar contacting first and second points on said shaft, said first and second points being positioned symmetrically with respect to a point of contact of said shaft with said friction drive bar; and means for resiliently urging said first and second support bars together whereby said friction drive bar is pinched between said pressure roller and said shaft.

* * * * *